Jan. 10, 1939.　　　W. D. ARCHEA ET AL　　　2,143,533
MACHINE TOOL
Filed July 28, 1933　　　4 Sheets-Sheet 1

Inventor
WALTER D. ARCHEA
CARLTON E. BROWN
By AHParsons
Attorney

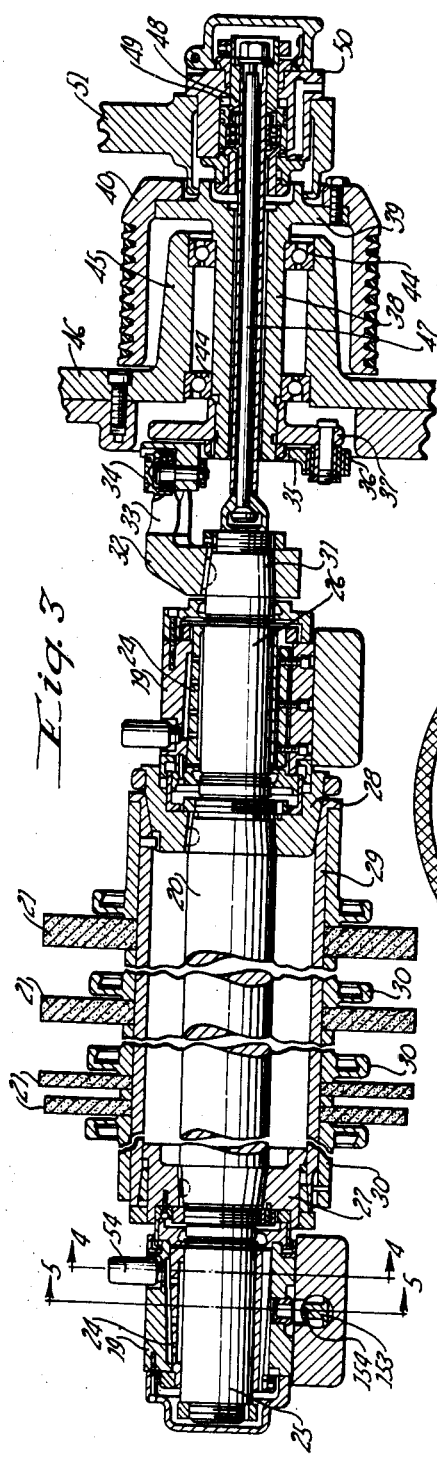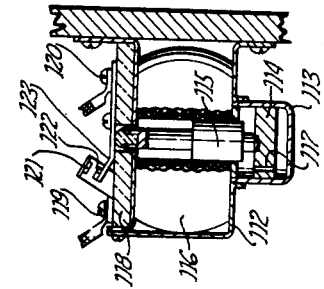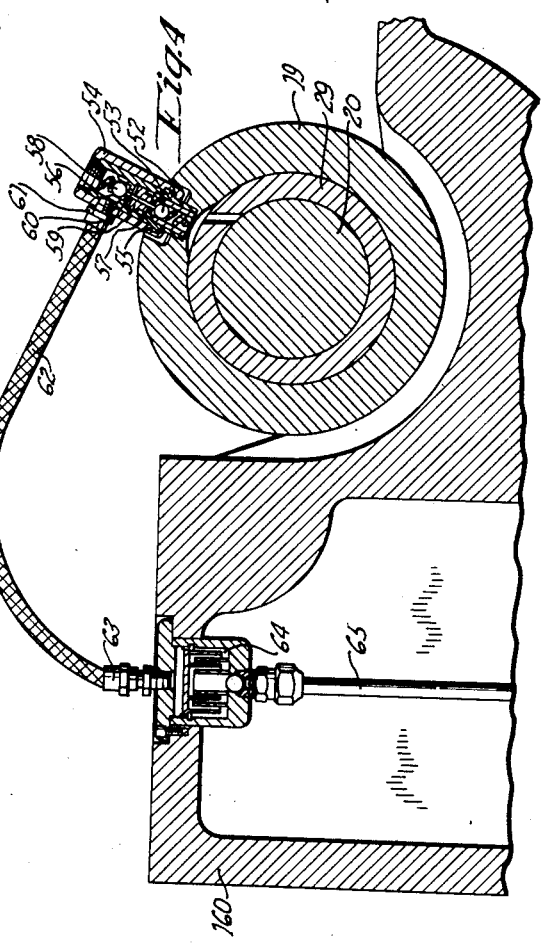

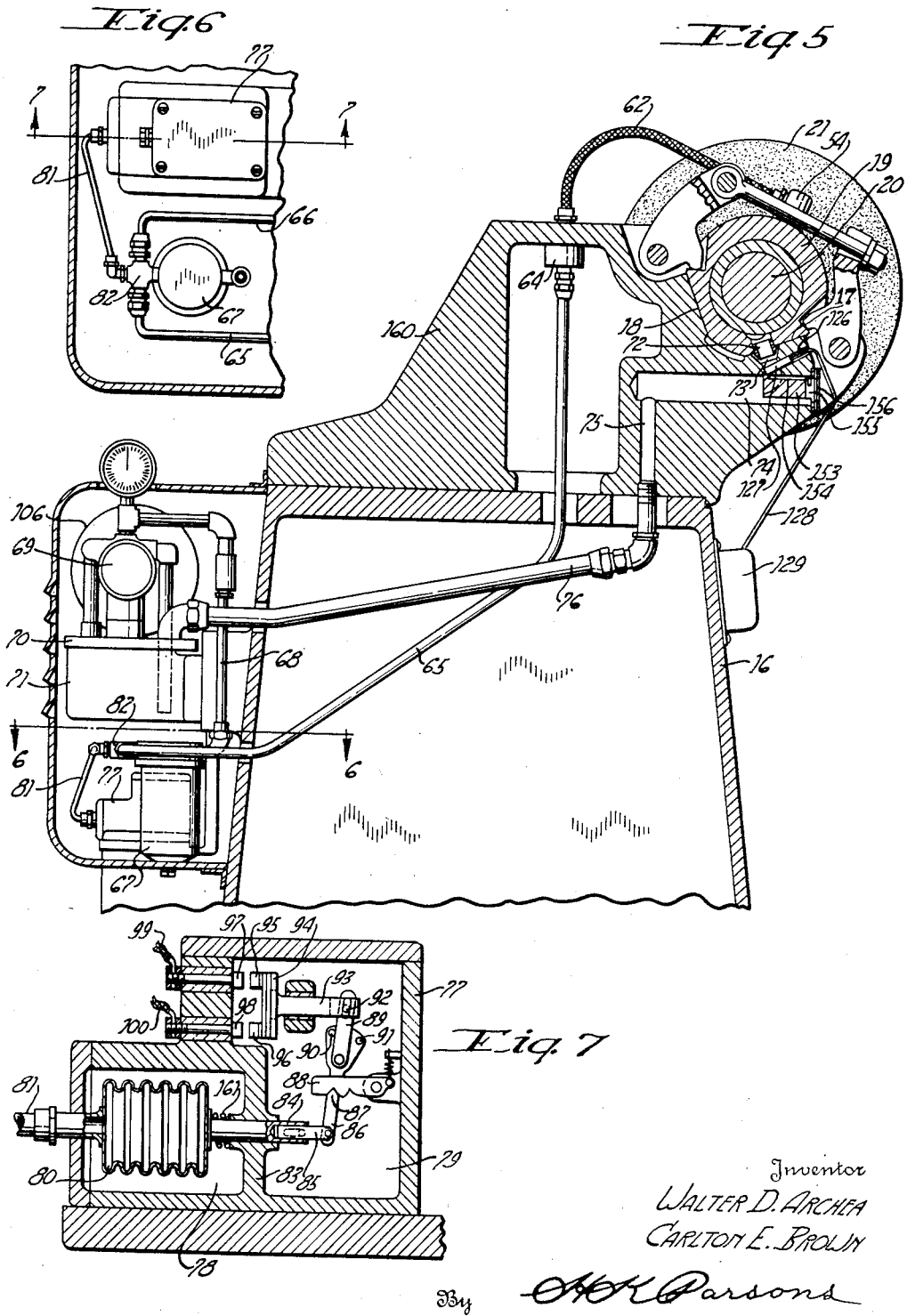

Jan. 10, 1939.  W. D. ARCHEA ET AL  2,143,533
MACHINE TOOL
Filed July 28, 1933   4 Sheets-Sheet 4

Inventor
WALTER D. ARCHEA
CARLTON E. BROWN
H. H. Parsons
Attorney

Patented Jan. 10, 1939

2,143,533

UNITED STATES PATENT OFFICE 2,143,533

MACHINE TOOL

Walter D. Archea and Carlton E. Brown, Cincinnati, Ohio, assignors to Cincinnati Grinders Incorporated, Cincinnati, Ohio, a corporation of Ohio Application July 28, 1933, Serial No. 682,652

20 Claims. (Cl. 184—6)

This invention relates to improvements in machine tools and particularly to improved means for insuring the proper lubrication of rapidly rotating shafts and spindles of said tools.

An object of the invention is therefore the provision of improved means for maintaining the sufficient and proper amount of lubricant on the journals of said rapidly rotating shaft and spindle.

Another object of the invention is the provision of means which will insure the lubrication of the shaft or spindle journals prior to the rotation of said shaft, thereby preventing overheating of said journals and supporting bearings when the machine is initially started.

A further object of the invention is the provision of improved means for insuring the necessary amount of lubricant being supplied to the shaft or spindle journal and its supporting bearing during the operation of the machine and which will immediately notify the machine operator upon failure of said supply of lubricant.

A still further object of this invention is the provision of improved means for insuring the adequate supply of lubrication to the rotating shaft or spindle journal and supporting bearing and which will automatically notify the machine operator of an insufficient quantity, pressure or improper temperature of the lubricant being utilized.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 3 is a longitudinal, sectional view through the spindle of the machine as seen particularly from line 3—3 on Figure 2.

Figure 4 is a sectional view taken on line 4—4 of Figure 3.

Figure 5 is a sectional view taken on line 5—5 of Figure 3.

Figure 6 is an elevational view of a portion of a disclosure in Figure 5 as seen particularly from line 6—6 on Figure 5.

Figure 7 is a sectional view taken on line 7—7 of Figure 6 illustrating a pressure operated switch which forms a detail of the invention.

Figure 9 is a sectional view through a time delay switch forming a detail of the invention.

Throughout the several views of the drawings the same reference characters are employed to denote the same or similar parts.

As was noted above, this invention relates to improvements in machine tool structures, particularly to such structures involving a rapidly rotating shaft or spindle and the invention will probably find its most useful application in connection with the grinding wheel spindle of grinding machines. As is well known, a grinding wheel spindle must fit very closely to its bearings so as to insure the proper rotation of said spindle about an unvarying axis to hold chatter to a minimum and produce the most accurate work pieces. With close fitting spindles difficulty and breakdowns have been encountered due to the heating up of the bearing and spindle, causing a scoring of the spindle and seizing thereof by the bearing. This condition is usually caused by an insufficient amount of lubricant being supplied to the bearing prior to the operation of the spindle or during the operation thereof. In order to overcome this inconvenience and grinding machine shut-downs there is provided in this invention improvements which will insure the proper amount of lubrication prior to the starting of the machine and will insure the proper amount of lubrication during the operation or rotation of the spindle or shaft.

The invention has been illustrated in connection with a centerless grinder, although it is to be understood that it has equal applications to other types of grinding machines as well as other machine tools generally.

Figure 1:
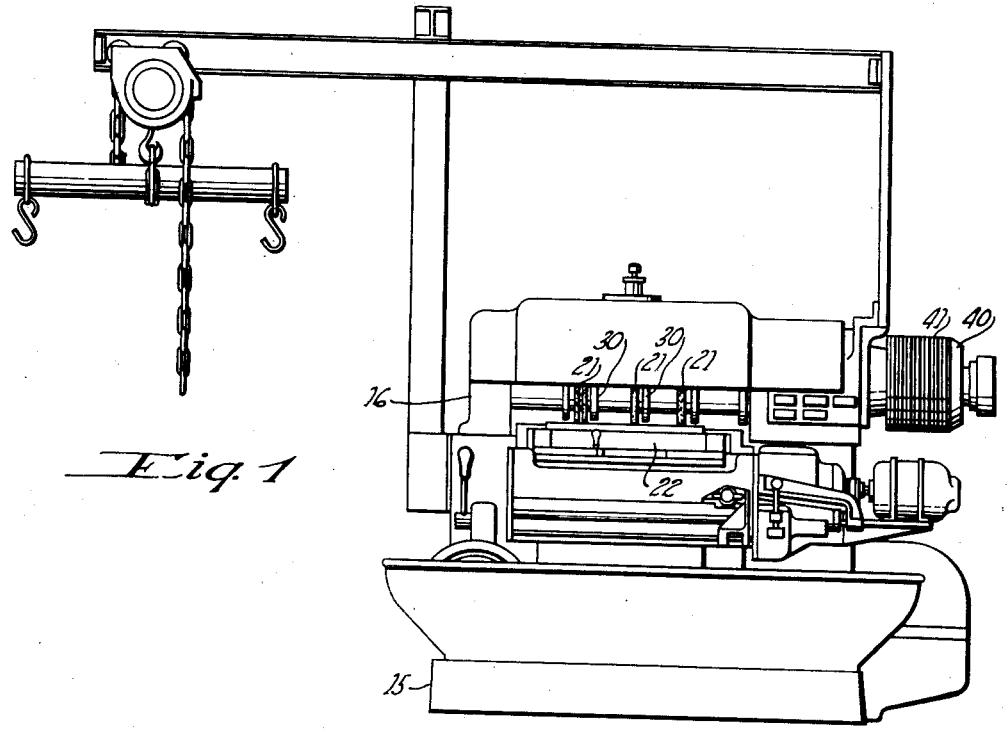
Figure 1 is a front elevation of a machine tool embodying the improvements of this invention.

Specifically, the machine shown in the drawings comprises a bed plate 15 having rising therefrom a column 16 which in actual practice has an inclination to the vertical (not shown in the drawings). The upper end of the column has secured to it a spindle housing or casting 160 on opposite ends of which there are provided angularly milled seats such as illustrated at 18, see Figure 5, on which are disposed journal boxings 19 for the grinding wheel spindle 20. The grinding wheel spindle 20 has secured to it intermediate its ends in spaced relation, as seen in Figure 1, a plurality of grinding wheels 21.

Figure 2:
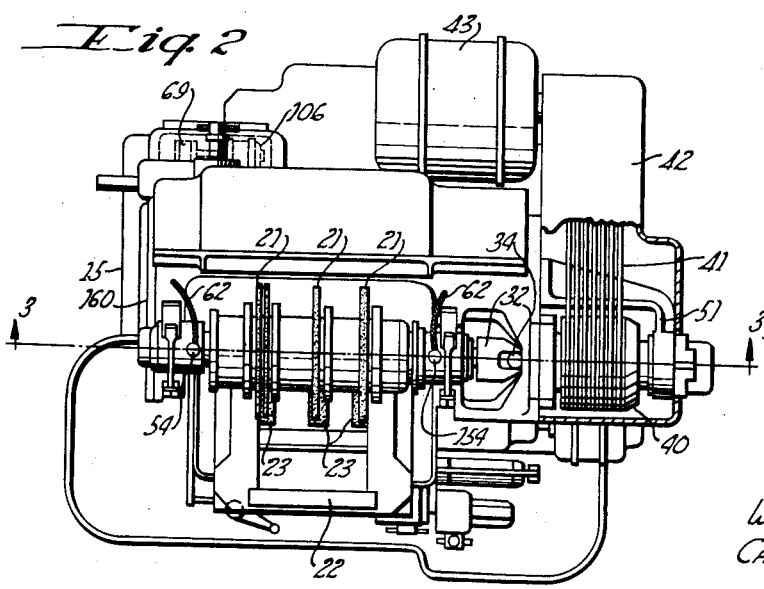
Figure 2 is a top plan view of the machine shown in Figure 1, certain parts being removed to more clearly disclose the structure.

Mounted on the bed adjacent the grinding wheels 21 is a work loading mechanism indicated generally by the numeral 22 for presenting work pieces to the grinding wheel. The work may be driven by any suitable means, such as the regulating wheels 23 shown in Figure 2. As is well known, the regulating wheels are rotated at a relatively slow work rotation controlling rate of speed. Since the work support and regulating wheels form no part of the present invention it is deemed unnecessary to further disclose or describe said parts.

As shown in Figure 3, the journal boxes 19 each include a bearing or journal sleeve 24 adapted to closely engage the spindle journals 25 and 26. Secured to the spindle 20 adjacent the bearings 25 and 26 are tapered heads 27 and 28 supporting for rotation with the spindle a cylinder 29. It is to this cylinder 29 that the wheels 21 are in reality secured, being spaced from one another by suitable spacing members 30.

The spindle 20 and parts carried thereby are rotated by an independent shaft for which purpose the spindle carries at its rear end or adjacent the journal 26, as seen in the drawings, a tapered nose 31 to which is secured a spider 32 having a plurality of arms such as 33, only one of which is disclosed. The arms 33 are in effect bifurcated to receive anti-friction driving rollers 34 secured to an intermediate plate 35. The plate 35 is in turn provided with radial slots receiving therein rollers 36 carried by the flange 37 which is in turn secured to a hollow shaft 38. The shaft 38 has its other end provided with a radial flange 39 to which is bolted a sheave or pulley 40. The sheave 40 is of the multiple groove type receiving the multiple, flexible belts 41 which are in turn trained about a driving pulley enclosed within the guard 42, see Figure 2. The driving pulley receives its power from an electric motor or prime mover 43 secured to the rear of the column 16.

The hollow driving shaft 38 is mounted on anti-friction bearings 44 carried by a sleeve 45 of a bracket 46 that is secured to the spindle housing or casting 160. From the foregoing it will be noted that the spindle 20 is suitably driven from a high speed motor through a flexible connection and without causing a direct belt pull on the spindle as was the past practice.

Extending through the hollow interior of the driving shaft 38 is a rod 47 having a swivel connection with the spindle 20 and connecting on its other end with a piston 48 enclosed within a cylinder 49 formed in housing 50. The housing 50 is secured to a bracket 51 that is carried by the side of the spindle housing or casting 160.

Any suitable means may be provided for supplying an hydraulic medium under pressure to opposite ends of the cylinder 49, thereby effecting an axial reciprocation of the piston within said cylinder and carrying with it the spindle and parts carried thereby. From this it will be seen that the grinding wheels may be axially adjusted during the grinding operation so as to break up grinding lines and the like on the work.

The journal boxes 19 each have screwed into them a nipple 52, enclosing a spring loaded check valve 53. Coupled with each of the nipples 52 is a coupling in the form of a sleeve 54, which sleeve 54 has a quick detachable connection at 55 with the nipple 52 so that a part revolution of the sleeve 54 relative to nipple 52 will permit a separation of the sleeve and nipple. Each of the sleeves 54 is divided internally into two chambers 56 and 57. On one side of the partition between said chambers is a spring pressed check valve 58 adapted to engage a valve seat formed in said partition. In each of the chambers 57 there is disposed a plug 59 which carries a rod 60 of such a length that when the sleeve 54 and nipple 52 are connected together it unseats the valves 53 and 58, thereby permitting a flow through the coupling 54 into the journal boxes 19 where the lubricant is supplied to the spindle journals and bearings.

Connected with each of the coupling sleeves 54 is one end 61 of a flexible lubricant hose or pipe 62. The end 61 of the hose empties into the chamber 56 within the sleeves 54 through which the lubricant passes to and through the nipples to the bearings. From this it will be seen that when the said sleeve is uncoupled from the nipple 52 the lubricant would continue to flow but is prevented from escape by the check valve 58. The other end 63 of the hose 62 is connected to a labyrinth separator 64 which consists of alternate concentric chambers having baffles between them which intercept any foreign particles that may be in the lubricant before the said lubricant is supplied to the bearings.

Connected with one end of the labyrinth housings are the ends of lubricant pipes 65 and 66, see Figure 6, which extend from an oil filter 67. The oil filter 67 is in turn connected by a pipe or conduit 68 to the outlet side of a lubricant circulating pump 69. This pump 69 is carried by a plate or cover 70 mounted on the open end of a tank or reservoir 71. The reservoir tank 71 is bolted or otherwise secured to the rear wall of the column 16.

Each of the journal boxes 19 is provided in its lower portions with outlet ports 72 connecting with ports 73, 74 and 75 formed in the spindle housing or casting 160; connecting with the lower end of the port 75 is one end of a conduit or pipe 76 which empties into the reserve tank 71.

By reference to Figure 5 it will be noted that the horizontal port 74 extends through the forward face of the spindle housing 160 and receives a plug 153 therein. This plug 153 has formed on its upper surface a passage 154 which communicates with the port 73. The forward end of the passage 154 empties into a chamber 155 formed at the forward end of the plug 153, and this chamber is closed or sealed by sight glasses 156 which afford visible access to the chamber 155. By this construction the operator is at all times advised visibly whether or not there is any lubricant flow through the bearings, since this chamber receives the lubricant only after it passes through the bearing and is on its way back to the tank or sump 71.

From the foregoing it will be noted that there is provided a lubricant circulating system which forces the lubricant through an oil purifier, through an additional labyrinth purifier and flexible, uncouplable connection to the journal bearing through which the lubricant flows and is returned to the lubricant reservoir.

As was noted above, it is necessary to supply a reasonable amount of lubricant to the spindle prior to the rotation thereof, which may be accomplished in several ways, but the most satisfactory way is that disclosed by the applicant. This method comprises the mechanism disclosed structurally in Figures 5, 6 and 7 and diagrammatically in Figure 10. As shown in these views, there is mounted adjacent the lubricant purifier a casing or housing 77 which is divided into two compartments 78 and 79. Mounted in the compartment 78 is a pressure expansible member or sleeve 80, connected at one end by a pipe 81 with the outlet coupling 82 from the lubricant purifier 67. It is this coupling 82 off which the lubricant pipes 65 and 66 are taken which terminate in the journal box 19. From this it will be seen that the same pressure will be interiorly of the member 80 as there is in the pipes 65 and 66.

Extending from the other end of the member 80 and projecting through the wall 83 between the compartments 78 and 79 is a shaft 84 connected by a link 85 with an arm or switch actuator 86. The arm 86 is pivoted intermediate its ends and is provided with a dog 87 which cooperates with the latch 88 forming between them a spring load and fire device as will be well understood by those conversant with machine tool structures.

The upper end of the arm 86 has pivoted to it a link 89 adapted to be actuated with the arm 86 by means of pins 90 and 91. It should be noted, however, that there is lost motion between the pins 90 and 91 and the arm 89 which must first be taken up before the link 89 can be actuated about its pivot by the arm 86. It is believed that the operation of this type of a structure is well understood since the nose 87 will ride up one side of the notch it is in until the top thereof is reached, whereupon the load and fire mechanism will cause it to ride down the side of the adjacent notch and thereby complete the firing or shifting of the parts.

Connected as by a pin and slot connection 92 with the upper end of the link 89 is a switch plunger 93 carrying on its inner end a switch plate 94 having contact members 95 and 96. The said contacts 95 and 96 are adapted to engage contacts 97 and 98 with which respectively are connected wires 99 and 100. The wire 100 is connected at its other end with the wire 101 of the main electrical source, while the wire 99 is connected at its other end with a magnetic coil 102. From the other end of the coil 102 is a wire 103 which connects with the second wire 104 of the main current source. The magnet 102 is adapted to operate a magnetic switch 105 constituting a controller for and thereby completing the circuit to the grinding wheel motor 43.

Figure 10:
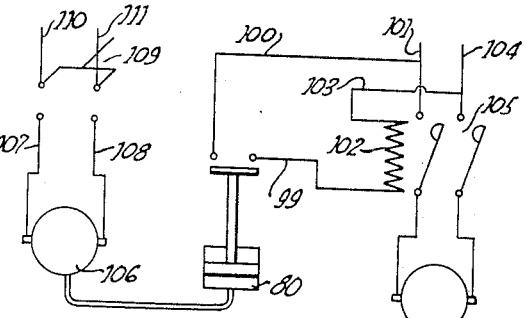
Figure 10 is a diagrammatic view of the coupling between the lubricant pump and shaft or spindle rotating motor and illustrating the use of a pressure operated switch.

As shown in Figure 10, the pump 69 is driven by a motor 106 having its opposite ends connected by wires 107 and 108 to the terminals of a switch member 109 which is in turn connected to the main current source as by wires 110 and 111.

The operation of this structure is as follows:

The switch 109 is first thrown which energizes the pump motor 106 and starts the operation of the lubricant pump which starts the circulation of the lubricant through the pipes above described. This of course places the lubricant under pressure. The lubricant is also forced into the pipe 81 and expansible member 80. As the pressure builds up, the expansible member is extended, thereby shifting the rod 84 to the right as seen in Figure 7, and through the load and fire mechanism closes the switch, including contacts 94 to 97 inclusive. The closing of this switch completes the electrical circuit to the switch 105 and effects the rotation of the spindle motor 43.

Surrounding the rod 84 from the expansible member 80 is a spring 161 abutting on opposite ends with the expansible member 80 and the partition wall 83. This spring is compressed during the expansion of the member and upon a drop in pressure within said member will return it to its normal size. At the same time, the member through the rod 84 will reversely actuate the parts connected therewith and will break the switch including the contacts 95 to 97 inclusive and de-energize the switch 105 for breaking the circuit to the spindle motor 43.

From the foregoing it will be noted that the grinding wheel spindle motor will be rotated only after a certain definite pressure has been built up in the lubricant fluid and that this pressure must be at all times maintained or the spindle will stop.

Figure 11:
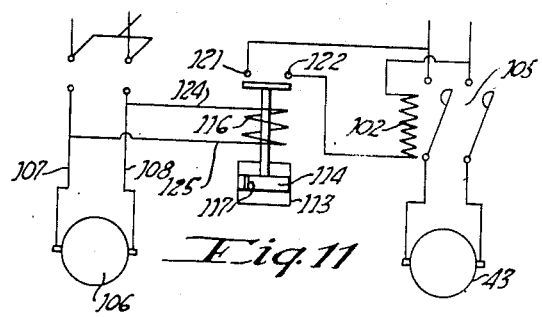
Figure 11 is a diagrammatic view illustrating the wiring diagram including the use of the time delay switch between the pump motor and shaft or spindle motor.

In Figures 9 and 11 there is illustrated structurally and diagrammatically the time delay switch which prevents the rotation of the spindle drive motor until the lubricant motor has been operating a certain predetermined time. This switch, as shown in Figure 9, comprises a housing 112 adapted to be secured to the column of the machine. Secured to the housing is a dashpot or cylinder 113 containing a piston 114. The piston 114 is secured to one end of a plunger 115 which is in effect the core of a solenoid 116 disposed within the housing 112. The cylinder 113 is filled on opposite sides of the piston 114 with a suitable lubricant, preferably oil, which oil is adapted to be transferred to opposite sides of the piston 114 through a restricted port 117 formed through the piston and affording communication between the fluid on both sides thereof.

Secured to the upper surface of the housing 112 is an insulation plate 118 carrying the connecting posts 119 and 120 for the two ends of the solenoid. Also mounted on the insulation plate 118 are switch contacts 121 and 122, the latter being carried by a spring arm 123 so mounted as to normally separate the contacts 121 and 122. The upper end of the plunger or core 115 contacts with the undersurface of the arm 123 so that when the said plunger or core is operated through the solenoid it springs the arm 123 in a direction to close the switch contacts 121 and 122.

The connection between the controller or line switch of the lubricant motor 106 and the actuator 102 for the controller 105 of the spindle motor 43 including the time delay switch is shown in Figure 11, and as there shown includes the wires 124 and 125 extending from the lubricant motor wires 107 and 108 to the solenoid posts 119 and 120.

From the foregoing it will be noted that when the switch 109 is closed to operate the motor 106 the current simultaneously flows through the wires 124 and 125 to the solenoid 116, thereby effecting a movement of the core 115 relative to the solenoid. The movement of this core, however, is restricted or permitted at a slow rate of speed, depending upon the size of the port 117 which determines the rate at which the core moves relative to the solenoid. This then causes a delay in the closing of the switch contacts 121 and 122, thereby causing a delay in the completion of the electrical circuit including the wires 99 and 100. This delay permits the lubricant motor to discharge the proper amount of lubricant to the spindle bearings before the spindle is rotated.

By this construction, also should the lubricant motor stop for any reason at all the current is then cut off to the solenoid 116 thereby permitting the spring arm 123 to return to its normal position, breaking the electrical circuit to the contacts 121 and 122 and stopping the rotation of the grinding wheel spindle until the trouble has been located and lubricant again supplied to the bearings.

Figure 12:
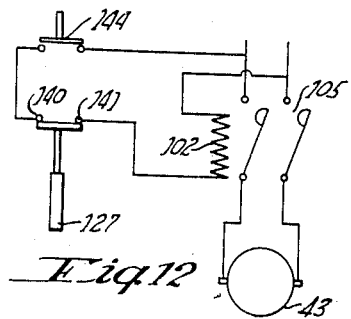
Figure 12 is a diagrammatic view illustrating the wiring diagram, including the temperature control switch placed in the lubricating pump motor circuit.
Figure 8:
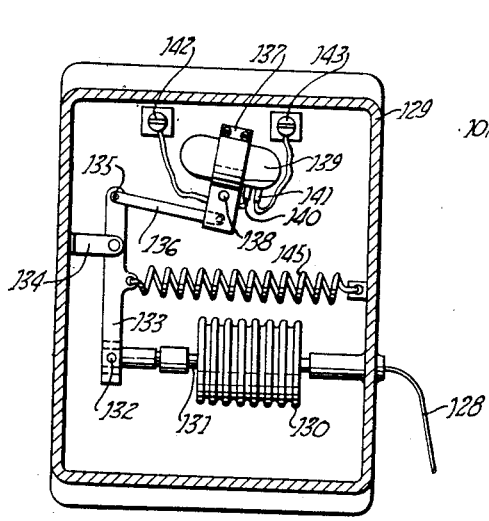
Figure 8 is a sectional view through a temperature operated switch which forms a detail of the invention.

In Figures 5, 8 and 12 there is structurally and diagrammatically illustrated a thermostatic control for the spindle motor. As shown in Figure 5, the spindle housing 160 has formed therein a bore 126 which intercepts the outlet port 73 from the spindle bearing or journal box. Disposed within this bore 126 is a sealed cartridge 127 connected at one end by a tube 128 with the mechanism shown in Figure 8 and which is enclosed within a housing 129 secured to the column 16. The other end of the tube 128 is sealed into one end of an expansible container 130, which container is similar to the container 80 described above and illustrated in sectional view in Figure 7. The cartridge 127, tube 128 and container 130 are filled with an expansible gas which expands upon a rise in temperature.

The other end of the container 130 has connected with it an axially shiftable rod 131 having a pivotal connection at 132 with one end of a lever 133. The lever 133 is pivoted intermediate its ends to a lug or bracket 134 extending inwardly from one wall of the housing 129. The upper end of the arm 132 is pivoted at 135 to a link 136 in turn pivotally connected with a carrier 137. The carrier 137 is pivoted intermediate its ends at 138 to the wall of the housing 129, and carries a mercury type of switch 139. The operation of the mercury type of switch is well understood in that when it is in one position the mercury fluid therein bridges a pair of contacts, such as 140 and 141, which when in a second position breaks this circuit. The contacts 140 and 141 are electrically connected with binding posts 142 and 143 carried by the switch housing 129.

In normal operation the mercury switch 139 is in the position illustrated, that is, completing the electrical circuit across the contacts 140 and 141, thereby completing the electrical circuit through the wires 99 and 100 to the magnetic switch 105 for the motor 43. This circuit, however, is controlled by a switch 144 placed in the line 100.

From this it will be seen that the lubricant circulating motor 106 has its circuit independent of the spindle drive motor 43 and each of these circuits are independently controlled. However, in the event that an insufficient supply of lubricant is delivered to the bearing, or the bearings are too tight, or for any reason at all the lubricant becomes unduly heated, it will in flowing over the cartridge 127 heat the gas therein. The heating of this gas effects an expansion of the chamber 130, thereby axially shifting the rod 131 and operating the mercury switch 139 to break the electrical circuit to the switch 105 and thereby stop the rotation of the spindle motor until the lubricant has sufficiently cooled to permit a contraction of the gas.

In order to hold the switch in its normal operative position the lever 133 has connected on it one end of a coil spring 145, having its other end connected to one wall of the housing 129. From this it will be seen that the switch is operative as long as the lubricant remains in a safe condition for insuring proper operation, but will immediately stop the rotation of the motor if the condition becomes dangerous to the spindle or bearing.

Figure 13:
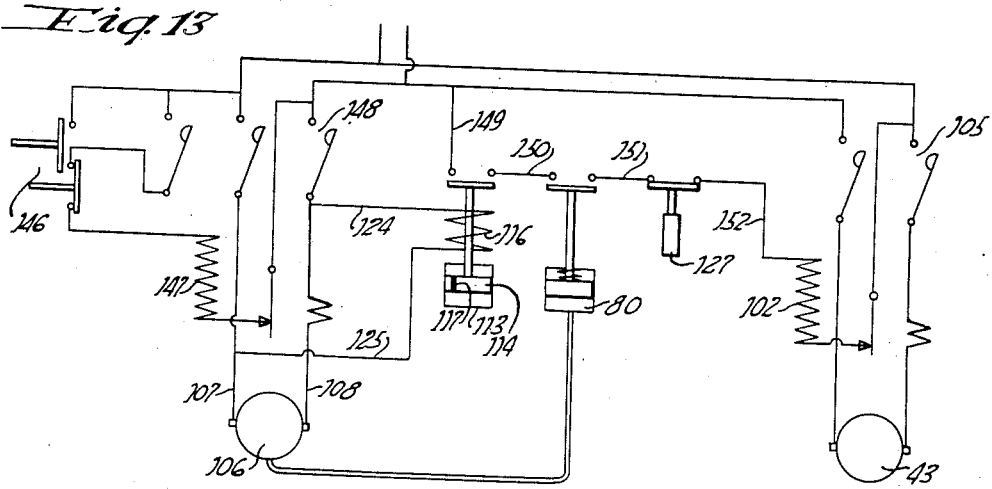
Figure 13 is a diagrammatic illustration of the use of the several independent switches interconnected in the pump and shaft or spindle rotating motors circuits.

In Figure 13 there is diagrammatically illustrated a mechanism in which all of the spindle motor control and safety mechanisms above described are included. The circuit illustrated in Figure 13 includes the usual push button type of starting and stopping switch 146 which energizes the magnet 147 of the magnetic starting switch 148 corresponding to previously described directly actuated switch 109 for the lubricant motor 106. The wires 107 and 108 of the motor 106 are connected, as shown in Figures 11 and 13, by wires 124 and 125 with the solenoid 116 of the time delay switch. One of the contacts of this switch is connected to one of the feed lines by a wire 149 and the other contact of this time delay switch is connected with one of the contacts of the pressure switch by the wire 150. The other contact of the pressure switch is connected by a wire 151 with one of the contacts of the serially arranged thermostatic control switch, which in turn has its other contact connected by a wire 152 with the magnet 102 of the starting switch or controller 105 for the spindle motor 43.

From this it will be seen that the spindle motor cannot be started until the lubricant motor is rotated; and the spindle motor cannot be started until the proper pressure has been developed in the lubricant. It will also be noted that should the lubricant motor be stopped the circuit to the spindle motor will be broken as will be the case should the pressure drop below a predetermined safe point, or should the temperature of the lubricant be raised to a dangerous point.

What is claimed is:

1. In a machine tool organization the combination with a housing, bearings in said housing, a spindle rotatably supported by the bearings, a prime mover for effecting the rotation of the spindle, a lubricant circulating system, an interlock between the lubricant circulating system and the spindle prime mover by virtue of which the operation of said lubricating system determines the operation of the spindle prime mover, including a pressure operated member operable by the pressure in said fluid circulating system for effecting rotation of the spindle prime mover, and means for reversely actuating said member to stop the operation of the controlled prime mover upon drop of pressure in the fluid circulating system.

2. In a machine tool organization the combination with a housing, bearings in said housing, a spindle rotatably supported by the bearings, a prime mover for effecting the rotation of the spindle, a lubricant circulating system, an interlock between the lubricant circulating system and the spindle prime mover by virtue of which the operation of said lubricating system determines the operation of the spindle prime mover, including a delayed actuating member operable by the lubricating system subsequently to effect the operation of the spindle, and yielding means for reversely actuating said delayed operating member upon stopping of the flow in the lubricating system, thereby stopping the operation of the spindle.

3. In a machine tool organization the combination with a housing, bearings in said housing, a spindle rotatably supported by the bearings, a prime mover for effecting the rotation of the spindle, a lubricant circulating system, and an interlock between the lubricant circulating system and the spindle prime mover by virtue of which the operation of said lubricating system determines the operation of the spindle and its prime mover, said interlock, including a thermostatic controlled member operable to stop the actuation of the spindle prime mover when the temperature of the lubricant circulating system rises.

4. In a mechanism of the class described for use with machine tool structures for insuring the proper lubrication of spindle bearings and the like the combination of a housing, bearings supported by said housing, a spindle rotatably journaled in said bearings, a lubricant circulating system including a prime mover for supplying lubricant to said bearings, a prime mover for effecting the rotation of the spindle, an interlock between the lubricant circulating system and its prime mover and the spindle prime mover which prevents the operation of the spindle prime mover until a sufficient time interval has elapsed after the starting of the lubricant circulating system and said system has developed the proper pressure in the lubrication, and means included in said interlock for stopping the rotation of the spindle member if the lubricant reaches excessive heat.

5. In a mechanism of the class described for use with machine tool structures for insuring the proper lubrication of spindle bearings and the like the combination of a housing, bearings supported by said housing, a spindle rotatably journaled in said bearings, a lubricant circulating system including a prime mover for supplying lubricant to said bearings, a prime mover for effecting the rotation of the spindle, an interlock between the lubricant circulating system and its prime mover and the spindle prime mover which prevents the operation of the spindle prime mover until a sufficient time interval has elapsed after the starting of the lubricant circulating system and said system has developed the proper pressure in the lubrication, and means included in said interlock for stopping the rotation of the spindle member if the lubricant reaches excessive heat, said interlock including a plurality of switch elements operable respectively by the fluid circulating system, fluid circulating system prime mover, and temperature of the lubricant.

6. In a spindle lubricating and rotation control mechanism the combination with a housing having spindle bearings formed therein, and a tool spindle rotatably mounted in the bearings, of a lubricant reservoir, a lubricant circulating system including a pump from said reservoir to the bearings and back to the reservoir, a lubricant filter in said system, a prime mover for rotating the spindle, an electrical circuit including a switch for actuating the spindle prime mover, and a pressure expansible member operatively coupled with said switch and the lubricant filter whereby the said expansible member is operated by the pressure in the lubricant circulating system for closing the switch and completing the electrical circuit to the spindle rotating prime mover.

7. In a spindle lubricating and rotation control mechanism the combination with a housing having spindle bearings formed therein, and a tool spindle rotatably mounted in the bearings, of a lubricant reservoir, a lubricant circulating system including a pump from said reservoir to the bearings and back to the reservoir, a lubricant filter in said system, a prime mover for rotating the spindle, an electrical circuit including a switch for actuating the spindle prime mover, a pressure expansible member operatively coupled with said switch and the lubricant filter whereby the said expansible member is operated by the pressure in the lubricant circulating system for closing the switch and completing the electrical circuit to the spindle rotating prime mover, and spring means compressible by the expansible member upon expansion thereof for contracting said member upon a drop in pressure in the lubricant circulating system and thereby stopping the rotation of the spindle prime mover.

8. In a spindle lubricating and rotation control mechanism the combination with a housing having spindle bearings formed therein, and a tool spindle rotatably mounted in the bearings, of a lubricant reservoir, a lubricant circulating system including a pump from said reservoir to the bearings and back to the reservoir, a lubricant filter in said system, a prime mover for rotating the spindle, an electrical circuit including a switch for actuating the spindle prime mover, a pressure expansible member operatively coupled with said switch and the lubricant filter whereby the said expansible member is operated by the pressure in the lubricant circulating system for closing the switch and completing the electrical circuit to the spindle rotating prime mover, spring means compressible by the expansible member upon expansion thereof for contracting said member upon a drop in pressure in the lubricant circulating system and thereby stopping the rotation of the spindle prime mover, and a load and fire mechanism between the expansible member and switch whereby the switch is positively and rapidly actuated to both an open and a closed position.

9. In a mechanism for insuring the proper lubrication of the bearings of a machine tool spindle and for controlling the rotation of said spindle the combination with a housing having bearings mounted therein, and a spindle rotatably journaled in said bearings, of a lubricant circulating system including a prime mover for circulating the lubricant, an electrical circuit for said prime mover including a starting switch therefor, a prime mover for effecting the rotation of the spindle, an electrical circuit for the spindle prime mover, a switch for said spindle prime mover circuit, and means connecting the lubricant prime mover circuit and spindle prime mover circuit whereby the spindle prime mover starting switch is closed a predetermined definite time interval after the closing of the lubricant circulating prime mover switch.

10. In a mechanism for insuring the proper lubrication of the bearings of a machine tool spindle and for controlling the rotation of said spindle the combination with a housing having bearings mounted therein, and a spindle rotatably journaled in said bearings, of a lubricant circulating system including a prime mover for circulating the lubricant, an electrical circuit for said prime mover including a starting switch therefor, a prime mover for effecting the rotation of the spindle, an electrical circuit for the spindle prime mover, a switch for said spindle prime mover circuit, and means connecting the lubricant prime mover circuit and spindle prime mover circuit whereby the spindle prime mover starting switch is closed a predetermined definite time interval after the closing of the lubricant circulating prime mover switch, said means comprising a solenoid operated switch, and a delay mechanism for controlling and retarding the closing of the said solenoid operated switch.

11. In a mechanism for insuring the proper lubrication of the bearings of a machine tool spindle and for controlling the rotation of said spindle the combination with a housing having bearings mounted therein, and a spindle rotatably journaled in said bearings, of a lubricant circulating system including a prime mover for circulating the lubricant, an electrical circuit for said prime mover including a starting switch therefor, a prime mover for effecting the rotation of the spindle, an electrical circuit for the spindle prime mover, a switch for said spindle prime mover circuit, and means connecting the lubricant prime mover circuit and spindle prime mover circuit whereby the spindle prime mover starting switch is closed a predetermined definite time interval after the closing of the lubricant circulating prime mover switch, said means comprising a solenoid operated switch, and a closed dashpot mechanism effectively retarding the operation of said switch.

12. In a mechanism for insuring the proper lubrication of the bearings of a machine tool spindle and for controlling the rotation of said spindle the combination with a housing having bearings mounted therein, and a spindle rotatably journaled in said bearings, of a lubricant circulating system including a prime mover for circulating the lubricant, an electrical circuit for said prime mover including a starting switch therefor, a prime mover for effecting the rotation of the spindle, an electrical circuit for the spindle prime mover, a switch for said spindle prime mover circuit, means connecting the lubricant prime mover circuit and spindle prime mover circuit whereby the spindle prime mover starting switch is closed a predetermined definite time interval after the closing of the lubricant circulating prime mover switch, said means comprising a solenoid operated switch, and a closed dashpot mechanism effectively retarding the operation of said switch, and yielding means for opening said switch upon the deenergization of the solenoid whereby should the electrical circuit to the lubricant circulating system prime mover be interrupted, thereby interrupting the circulation of the lubricant, the spindle prime mover will stop.

13. In a mechanism of the class described the combination of a spindle, supporting bearings for the spindle, power operated means for effecting rotation of the spindle, control means therefor, separate power operated means for effecting lubrication of the spindle and its bearings, control means for determining the operation of said lubricating means, and safety devices serially arranged between the control means for said respective power operated means, including a first mechanism operatively associated with the control for the lubricating means and a pressure responsive device coupled with the bearings and responsive to pressure conditions therein for energizing the spindle operating means subsequent to the operation of the lubrication control means whereby the spindle is automatically lubricated prior to and during its rotation.

14. In a mechanism of the class described the combination of a spindle, supporting bearings for the spindle, power operated means for effecting rotation of the spindle, control means therefor, separate power operated means for effecting lubrication of the spindle and its bearings, control means for determining the operation of said lubricating means, safety devices serially arranged between the control means for said respective power operated means, including a first mechanism operatively associated with the control for the lubricating means and a pressure responsive device coupled with the bearings and responsive to pressure conditions therein for energizing the spindle operating means subsequent to the operation of the lubrication control means whereby the spindle is automatically lubricated prior to and during its rotation, and additional means for discontinuing rotation of the spindle upon failure of operation of the lubricating means.

15. The combination of a driven member, power means for driving the same, means for initiating the operation of the power-driving means, a lubricating mechanism for supplying a lubricant to the bearings of said driven member, means controlled by the lubricating mechanism for rendering said initiating means ineffective until the lubricant at the bearings reaches a predetermined pressure, and means for stopping the power driving means when said pressure at the bearings drops below a predetermined value.

16. The combination with a machine tool structure including a rotatable spindle, supporting bearings therefor, and means for supplying lubricant under pressure to said bearing, of means for controlling the actuation of said spindle including a source of lubricant under pressure coupled with the bearings, a normally open pressure responsive switch member coupled with the bearings and actuable into circuit closing position upon existence of predetermined lubricant pressure at the bearings, a second serially arranged normally closed switch member, a thermostatic device in heat absorbing relation to the bearing lubricant and actuable by increase in temperature thereof for opening said normally closed switch, and power input control means serially coupled with said switches for determining the power actuation of the spindle.

17. The combination with a machine tool including a rotatable spindle, bearings therefor, and means for supplying lubricant under pressure to the bearings, of a safety mechanism for control of power actuation of the spindle, including a power actuator for the lubricating means, a control device for effecting actuation of said power means, a supplemental circuit for controlling actuation of the spindle, and a plurality of means, each including a make and break device, for determining the conditioning of the control circuit by completing or interrupting same, including a first means actuable by the control device for the lubricating means to shift its associated make and break device into control circuit closing position.

18. The combination with a machine tool including a rotatable spindle, bearings therefor, and means for supplying lubricant under pressure to the bearings, of a safety mechanism for control of power actuation of the spindle, including a power actuator for the lubricating means, a control device for effecting actuation of said power means, a supplemental circuit for controlling actuation of the spindle, a plurality of means each including a make and break device for determining the conditioning of the control circuit, by completing or interrupting same, including a first means actuable by the control device for the lubricating means to shift its associated make and break device into control circuit closing position, and additional means actuable by building up of pressure in the lubricating means for completing said control circuit.

19. The combination with a machine tool including a rotatable spindle, bearings therefor, and means for supplying lubricant under pressure to the bearings, of a safety mechanism for control of power actuation of the spindle, including a power actuator for the lubricating means, a control device for effecting actuation of said power means, a supplemental circuit for controlling actuation of the spindle, a plurality of means, each including a make and break device, for determining the conditioning of the control circuit by completing or interrupting same, including a first means actuable by the control device for the lubricating means to shift its associated make and break device into control circuit closing position, additional means actuable by building up of pressure in the lubricating means for completing said control circuit, a delay mechanism for retarding the reaction of said first circuit conditioning means, and means responsive to temperature of the lubricant at the bearings for additionally determining the operative effect of the control circuit by completing or interrupting same.

20. The combination with a machine tool including a rotatable spindle, bearings therefor, and means for supplying lubricant under pressure to the bearings, of a safety mechanism for control of power actuation of the spindle, including a power actuator for the lubricating means, a control device for effecting actuation of said power means, a supplemental circuit for controlling actuation of the spindle, a plurality of means, each including a make and break device, for determining the conditioning of the control circuit by completing or interrupting same, including a first means actuable by the control device for the lubricating means to shift its associated make and break device into control circuit closing position, additional means actuable by building up of pressure in the lubricating means for completing said control circuit, and means responsive to temperature of the lubricant at the bearings for making and breaking the control circuit.

WALTER D. ARCHEA.
CARLTON E. BROWN.